(12) United States Patent
Negishi et al.

(10) Patent No.: US 7,553,892 B2
(45) Date of Patent: Jun. 30, 2009

(54) OPTICAL FILM

(75) Inventors: Yoshinori Negishi, Saitama (JP); Shinichi Ishikawa, Saitama (JP); Etsuo Tobita, Saitama (JP); Takashi Ayabe, Saitama (JP)

(73) Assignee: Adeka Corporation, Tokyo (JP)

( * ) Notice: Subject to any disclaimer, the term of this patent is extended or adjusted under 35 U.S.C. 154(b) by 220 days.

(21) Appl. No.: 11/596,113

(22) PCT Filed: Apr. 26, 2005

(86) PCT No.: PCT/JP2005/008392

§ 371 (c)(1),
(2), (4) Date: Nov. 9, 2006

(87) PCT Pub. No.: WO2005/109052

PCT Pub. Date: Nov. 17, 2005

(65) Prior Publication Data

US 2007/0215845 A1 Sep. 20, 2007

(30) Foreign Application Priority Data

May 12, 2004 (JP) .............................. 2004-142349

(51) Int. Cl.
C08K 5/3495 (2006.01)
(52) U.S. Cl. ...................... 524/100; 523/122
(58) Field of Classification Search .................. 524/100
See application file for complete search history.

(56) References Cited

U.S. PATENT DOCUMENTS

2002/0028862 A1* 3/2002 Johnson et al. ............. 524/100
2002/0102368 A1* 8/2002 Ono et al. .................. 428/1.33

FOREIGN PATENT DOCUMENTS

EP 00870797 * 4/1997
WO WO2008086929 * 7/2008

* cited by examiner

Primary Examiner—Kriellion A Sanders
(74) Attorney, Agent, or Firm—Millen, White, Zelano, Branigan, P.C.

(57) ABSTRACT

The present invention provides an optical film, which is excellent in ultraviolet absorption capability at 380 nm with little bleed-out, comprising a resin containing a triazine compound represented by the following general formula (I).

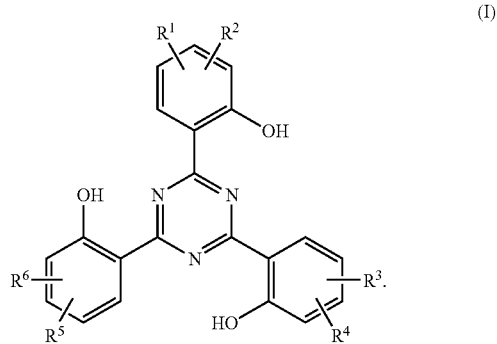

(In the formula, $R^1$-$R^6$ may be a hydrogen atom; hydroxyl group; or an organic group selected from among an alkyl group, alkoxy group, dialkyl amino group, alkyl carbonyloxy group, aryl group, arylated alkyl group, aryloxy group, arylated alkyloxy group and an aryl carbonyloxy group having 18 or less carbon atoms, independently. However, the alkyl part of these organic groups may be substituted by a hydroxyl group, halogen atom, cyano group or nitro group, interrupted by an oxygen atom, sulfur atom, carbonyl group, ester group, amide group or imino group, or have a double bond, and these substitutions, interruptions and double bonds may be combined).

18 Claims, No Drawings

US 7,553,892 B2

OPTICAL FILM

TECHNICAL FIELD

The present invention relates to an optical film made of a resin, the film containing a specific ultraviolet absorber, and in particular to various functional films such as a polarizing plate protective film, a phase difference film, a viewing angle expansion film, an optical compensation film used for liquid crystal displays, and an anti-reflection film used in a plasma display, to an optical compensation film for an organic EL display, and to a luminous protective film etc.

BACKGROUND ART

Since it is lightweight compared with glass, resin is used in very many optical fields such as optical lenses, prisms, optical fibers and various optical films. However, there is a problem that in a resin film, the strength of the film falls due to ultraviolet radiation, or transparency falls due to discoloration, and for optical film use, this problem has serious consequences.

For this reason, an ultraviolet absorber such as a benzotriazole compound or a triazine compound is used in an optical film. For example, JP,2002-249600,A (Claim 2, [0018]) [0029], [0031]) or JP,2001-324616,A (Claim 2, [0025], [0053], [0059]) disclose a norbornene resin film containing an ultraviolet absorber.

However, in the case of a prior art ultraviolet absorber, absorption is shifted to the low wavelength side. Since the absorption at 380 nm is low, ultraviolet absorber of a large amount, which gives the required absorbing power must be used, so bleed-out or a change of color tone could not be avoided.

JP,11-71356,A (Claim 1, [0009]-[0027], and [0042]-[0047]) disclose a triazine compound ultraviolet absorber, but there is no mention of an optical film.

Hence, an optical film containing sufficient ultraviolet absorber to have an ultraviolet absorption capability at a wavelength of 380 nm to make it suitable for an optical film, and with little bleed-out, had not yet been obtained.

SUMMARY OF THE INVENTION

It is therefore an object of the present invention to provide an optical film having superior absorbing power with respect to ultraviolet radiation at a wavelength of 380 nm, and with little bleed-out of this ultraviolet absorber.

As a result of repeated studies, the Inventors were able to solve the above problem using an ultraviolet absorber comprising a specific triazine compound, and thereby arrived at the invention.

Specifically, a first invention provides an optical film comprising a resin containing a triazine compound represented by the following general formula (I):

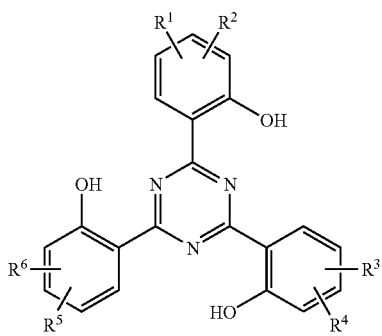

(I)

(in the formula, $R^1$-$R^6$ may each be a hydrogen atom; hydroxyl group; or an organic group selected from among an alkyl group, alkoxy group, dialkyl amino group, alkyl carbonyloxy-group, aryl group, arylated alkyl group, aryloxy group, arylated alkyloxy group and an aryl carbonyloxy-group, having 18 or less carbon atoms, independently. However, the alkyl part of these organic groups may be substituted by a hydroxyl group, halogen atom, cyano group or nitro group, interrupted by an oxygen atom, sulfur atom, carbonyl group, ester group, amide group or imino group, or have a double bond, and these substitutions, interruptions and double bonds may be combined).

A second invention provides the optical film according to the first invention wherein the triazine compound is represented by the following general formula (II):

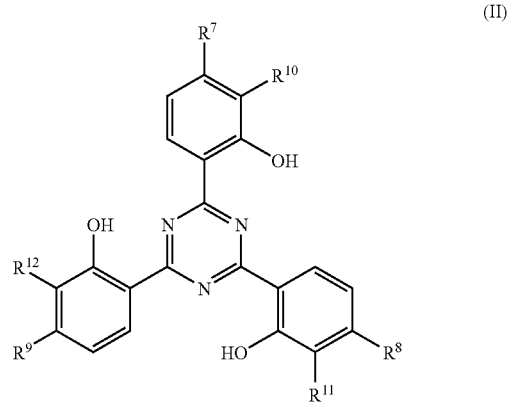

(II)

(in the formula, $R^7$-$R^9$ may each be a hydroxyl group, or an organic group selected from among an alkoxy group, a dialkyl amino group and an alkyl carbonyloxy group having 18 or less carbon atoms, independently. However, the alkyl part of these alkoxy groups and alkyl carbonyloxy groups may be substituted by a hydroxyl group, halogen atom, cyano group or nitro group, interrupted by an oxygen atom, sulfur atom, carbonyl group, ester group, amide group or imino group, or have a double bond, and these substitutions, interruptions and double bonds may be combined. $R^{10}$-$R^{12}$ each represents the same atoms or same groups as $R^1$-$R^6$, respectively).

A third invention provides the optical film according to the first or second invention, wherein the transmittance of the film with respect to light of 380 nm is 20% or less.

A fourth invention provides an optical film according to any of the first-third inventions, wherein the optical film is for use in an image display device.

DESCRIPTION OF THE PREFERRED EMBODIMENTS

Hereafter, the embodiments of the invention will be described.

An ultraviolet absorber used for an optical film according to the invention is a triazine compound represented by the aforesaid general formula (I). In the general formula (I), the alkyl group (straight chain, branched and cyclic) having 18 or less carbon atoms represented by $R^1$-$R^6$ may be methyl, ethyl, propyl, isopropyl, butyl, s-butyl, t-butyl, isobutyl, amyl, isoamyl, t-amyl, hexyl, heptyl, 2-methylhexyl, isoheptyl, t-heptyl, n-octyl, isooctyl, t-octyl, 2-ethylhexyl, nonyl, isononyl, decyl, dodecyl, tridecyl, tetradecyl, pentadecyl, hexadecyl, heptadecyl, octadecyl, cyclopentyl, cyclohexyl, cycloheptyl or cyclooctyl. Examples of substituted and interrupted groups are chloromethyl, dichloromethyl, trichloromethyl, 2-hydroxyethyl, 2-hydroxypropyl, 3-hydroxypropyl, 2-methoxyethyl, 2-ethoxyethyl, 2-butoxyethyl, 2-methoxypropyl, 3-methoxypropyl, 2,3-dihydroxypropyl, 2-hydroxy-3-methoxypropyl, 2,3-dimethoxypropyl and 2-(2-methoxyethoxy)ethyl.

Examples of an alkoxy groups having 18 or less carbon atoms represented by $R^1$-$R^6$ are methyloxy, ethyloxy, propyloxy, isopropyloxy, butyloxy, s-butyloxy, t-butyloxy, isobutyloxy, amyloxy, isoamyloxy, t-amyloxy, hexyloxy, heptyloxy, 2-methylhexyloxy, isoheptyloxy, t-heptyloxy, n-octyloxy, isooctyloxy, t-octyloxy, 2-ethylhexyloxy, nonyloxy, iso nonyloxy, decyloxy, dodecyloxy, tridecyloxy, tetradecyloxy, pentadecyloxy hexadecyloxy, heptadecyloxy, octadecyloxy, cyclopentyloxy, cyclohexyloxy, cycloheptyloxy and cyclooctyloxy. Examples of substituted and interrupted groups are chloromethyloxy, dichloromethyloxy, trichloro methyloxy, 2-hydroxyethyloxy, 2-hydroxypropyloxy, 3-hydroxypropyloxy, 2,3-dihydroxypropyloxy, 2-(2-hydroxyethoxy)ethyloxy, 2-methoxyethyloxy, 2-ethoxyethyloxy, 2-butoxyethyloxy, 2-octyloxyethyloxy, 2-methoxy propyloxy, 3-methoxypropyloxy, 2-methoxy-3-hydroxypropyloxy, 2-hydroxy-3-methoxypropyloxy, 2,3-dimethoxypropyloxy, 2-hydroxy-3-octyloxypropyloxy, 2-(2-methoxyethoxy)ethyloxy, 2-hydroxy-3-(2-methoxy ethoxy) propyloxy, 2-acetoxyethyloxy, 2-acetoxypropyloxy, 3-acetoxy propyloxy, 2-(2-acetoxyethoxy)ethyloxy, 2-propionylethyloxy, 2-octanoyl ethyloxy and 2-dibutylcarbamoylethyloxy.

Examples of a dialkylamino group having 18 carbon atoms or less represented by $R^1$-$R^6$ are dimethylamino, ethylmethylamino, diethylamino, dibutylamino, dioctylamino and 1-piperidyl.

Examples of an alkylcarbonyloxy group having 18 or less carbon atoms represented by $R^1$-$R^6$, when $R^1$-$R^6$ is a hydroxyl group, are groups derived from organic carboxylic acids. Examples of the organic carboxylic acid which gives rise to such groups are acetic acid, propionic acid, butyric acid, isobutyric acid, valeric acid, caproic acid, caprylic acid, 2-ethylhexanoic acid, pelargonic acid, capric acid, neodecanoic acid, undecanoic acid, lauric acid, tridecanoic acid, myristic acid, pentadecanoic acid, palmitic acid, margaric acid, stearic acid, cyclohexane carboxylic acid, 3-methylcyclohexane carboxylic acid, 4-methylcyclohexane carboxylic acid, and 2,4-dimethylcyclohexane carboxylic acid. Examples of the organic carboxylic acid, which introduce a substituted or interrupted groups, are chloroacetic acid, dichloroacetic acid, trichloroacetic acid, trifluoroacetic acid and 12-hydroxystearic acid.

Examples of an aryl group having 18 or less carbon atoms represented by $R^1$-$R^6$ are phenyl, naphthyl, 2-methylphenyl, 3-methylphenyl, 4-methyl phenyl, 4-vinylphenyl, 3-isopropylphenyl, 4-isopropylphenyl, 4-butylphenyl, 4-isobutylphenyl, 4-t-butylphenyl, 4-hexylphenyl, 4-cyclohexylphenyl, 4-octylphenyl, 4-(2-ethylhexyl)phenyl, 2,3-dimethylphenyl, 2,4-dimethyl phenyl, 2,5-dimethylphenyl, 2,6-dimethylphenyl, 3,4-dimethylphenyl, 3,5-dimethylphenyl, 2,4-di-t-butylphenyl, 2,5-di-t-butylphenyl, 2,6-di-t-butylphenyl, 2,4-di-t-pentylphenyl, 2,5-di-t-amylphenyl, 2,5-di-t-octylphenyl, biphenyl and 2,4,5-trimethylphenyl. Examples of an arylated alkyl group are benzyl, phenethyl, 2-phenyl propane-2-yl and diphenylmethyl.

Examples of an aryloxy group having 18 or less carbon atoms represented by $R^1$-$R^6$ are phenyloxy, naphthyloxy, 2-methylphenyloxy, 3-methyl phenyloxy, 4-methylphenyloxy, 4-vinylphenyloxy, 4-isopropylphenyloxy, 4-butylphenyloxy, 4-isobutylphenyloxy, 4-t-butylphenyloxy, 4-hexyl phenyloxy, 4-cyclohexylphenyloxy, 4-octylphenyloxy, 4-(2-ethylhexyl)phenyloxy, 2,3-dimethylphenyloxy, 2,4-dimethylphenyloxy, 2,5-dimethyl phenyloxy, 2,6-dimethylphenyloxy, 3,4-dimethylphenyloxy, 3,5-dimethyl phenyloxy, 2,4-di-t-butylphenyloxy, 2,5-di-t-butylphenyloxy, 2,6-di-t butylphenyloxy, 2,4-di-t-pentylphenyloxy, 2,5-di-t-amylphenyloxy, 2,5-di-t-octyl phenyloxy, biphenyloxy and 2,4,5-trimethylphenyloxy. Examples of an arylated alkyloxy group are benzyloxy, phenethyloxy, 2-phenylpropane-2-yl-oxy and diphenylmethyloxy.

Examples of the aryl carbonyloxy group having 18 carbon atoms or less represented by $R^1$-$R^6$, when $R^1$-$R^6$ is a hydroxyl group, are groups derived from an organic carboxylic acid. Examples of the organic carboxylic acid which gives rise to these derivatives are benzoic acid, 4-hydroxybenzoic acid, salicylic acid, naphthoic acid, 4-methylbenzoic acid, 4-t-butylbenzoic acid and 4-octylbenzoic acid.

Among the triazine compounds represented by the general formula (I), compounds represented by the general formula (II) are preferred, since these compounds are easy to manufacture and low cost.

The triazine compound represented by the general formula (II) is a compound wherein each of $R^1$, $R^3$, and $R^5$ (or $R^2$, $R^4$, and $R^6$ is a hydroxyl group, alkoxy group, dialkylamino group or alkyl carbonyloxy group situated in the fourth position in the general formula (I), and each of $R^2$, $R^4$, and $R^6$ (or $R^1$, $R^3$, and $R^5$) are situated in the third position. The third position substituent $R^{10}$-$R^{12}$ may independently be for example the aforesaid groups exemplified as $R^1$-$R^6$. $R^7$-$R^9$ situated in the fourth position are independently organic groups selected from among a hydroxyl group, alkoxy group, dialkylamino group and alkyl carbonyloxy group, and specifically groups corresponding thereto among the groups exemplified as $R^1$-$R^6$.

Examples of preferred triazine compounds represented by the general formula (II) according to the invention, are Compounds No. 1-No. 36 shown below. In addition, in the following chemical formula, Me is methyl, Et is ethyl, Bu is butyl, Am is amyl, iAm is isoamyl, Hx is hexyl and cyHx is cyclohexyl.

compound No. 1
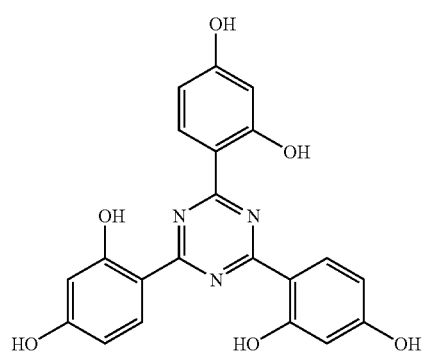
compound No. 2
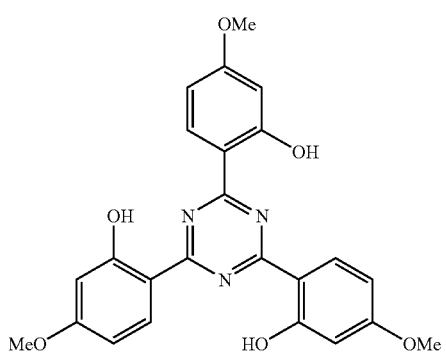
compound No. 3
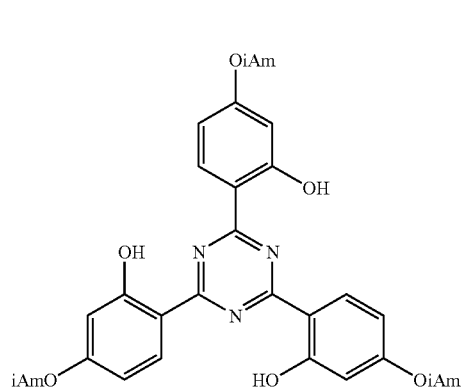
compound No. 4
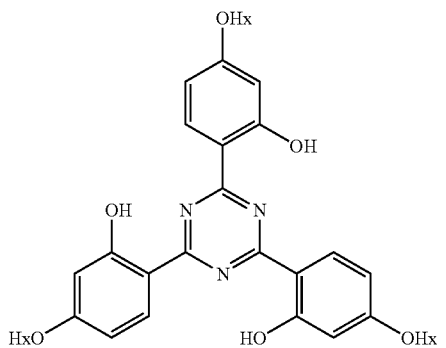
compound No. 5
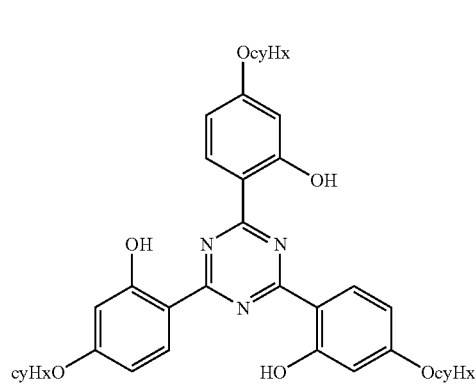
compound No. 6
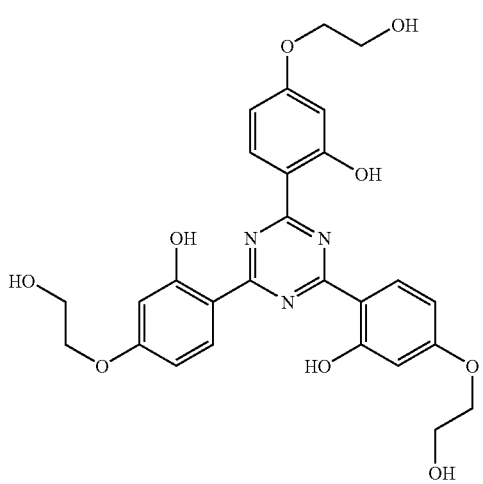

-continued
compound No. 7
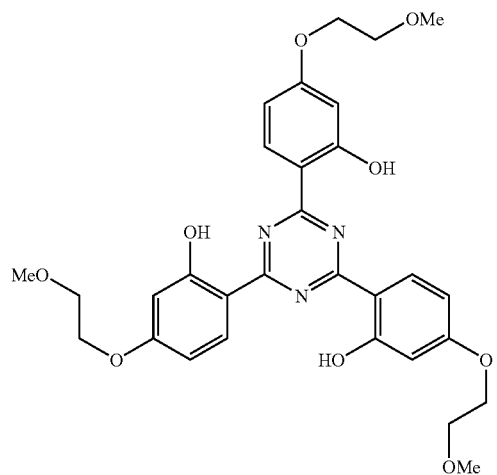
compound No. 8
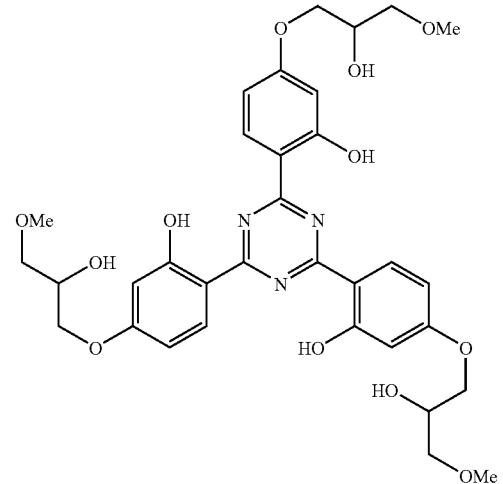
compound No. 9
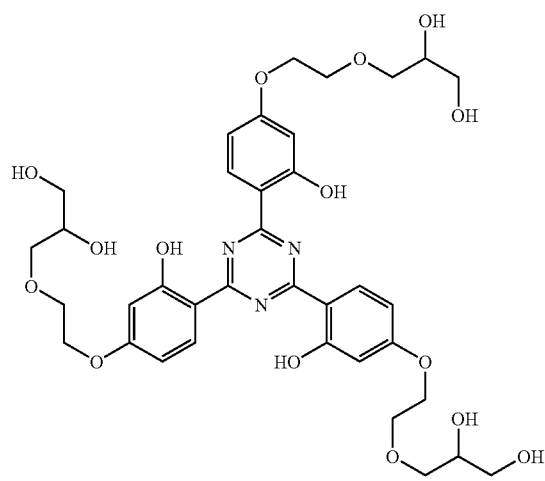
compound No. 10
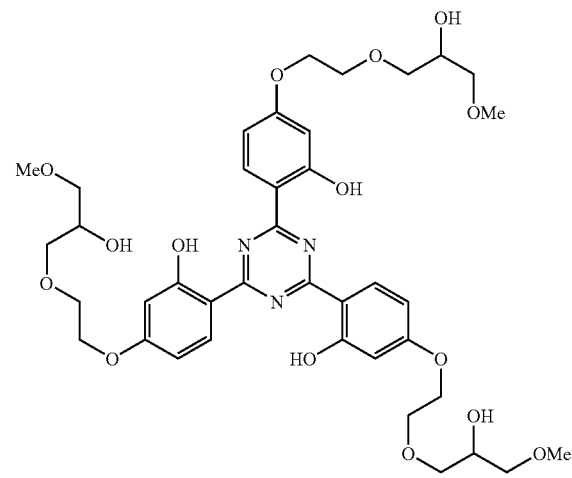
compound No. 11
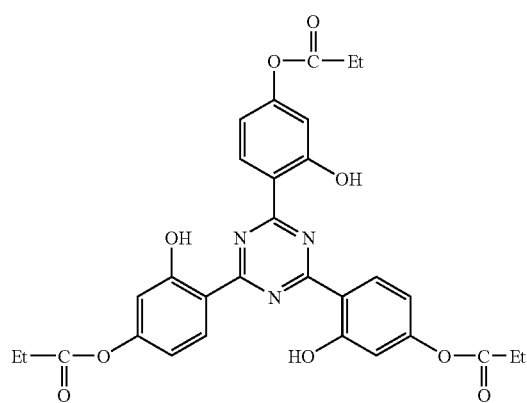
compound No. 12
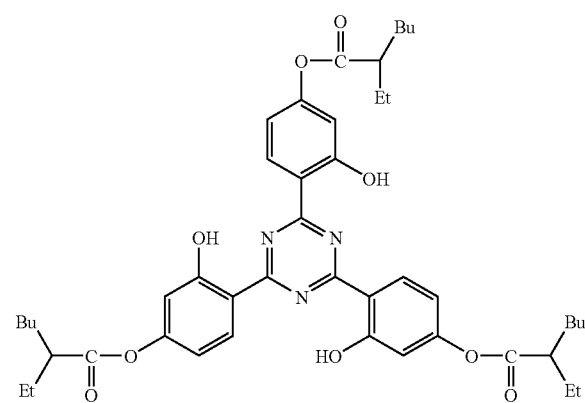

-continued
compound No. 13
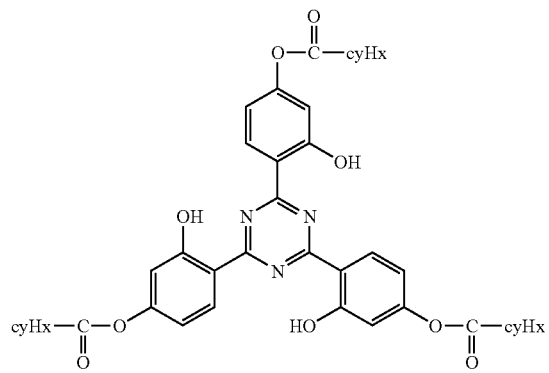
compound No. 14
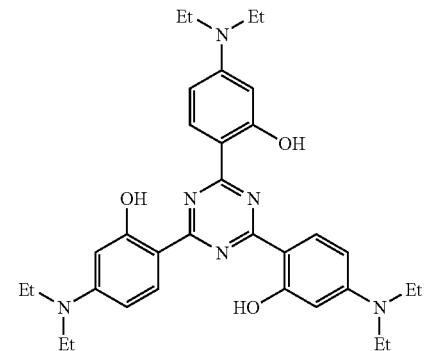
compound No. 15
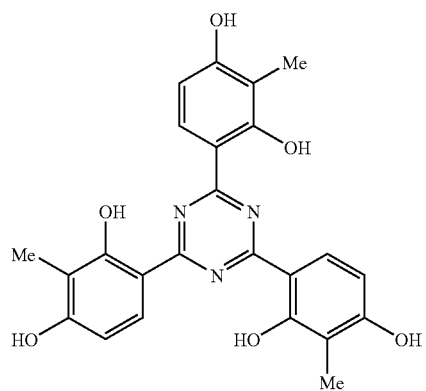
compound No. 16
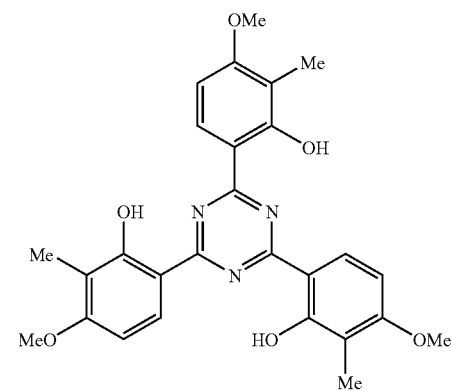
compound No. 17
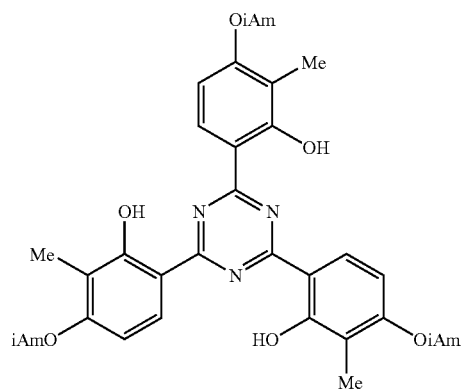
compound No. 18
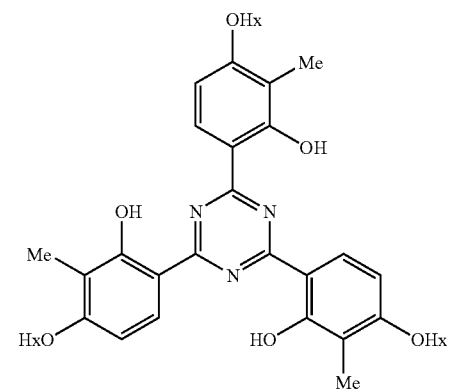

-continued
compound No. 19
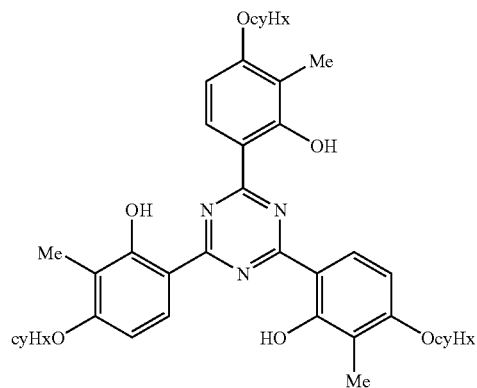
compound No. 20
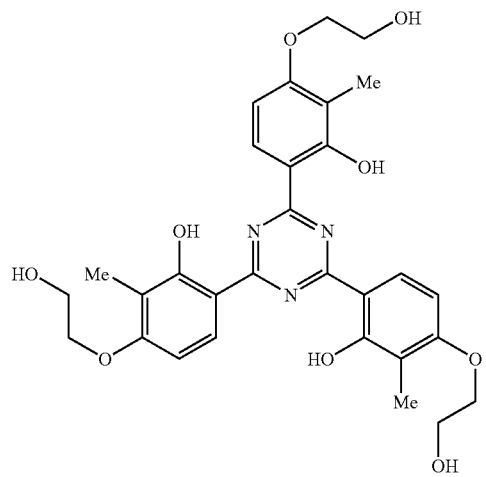
compound No. 21
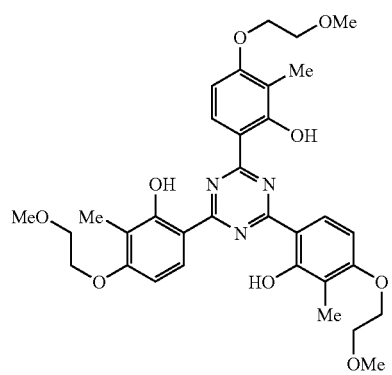
compound No. 22
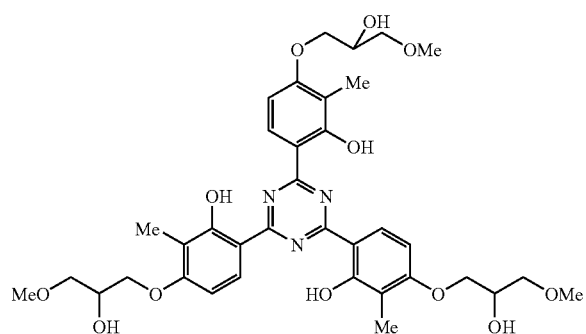
compound No. 23
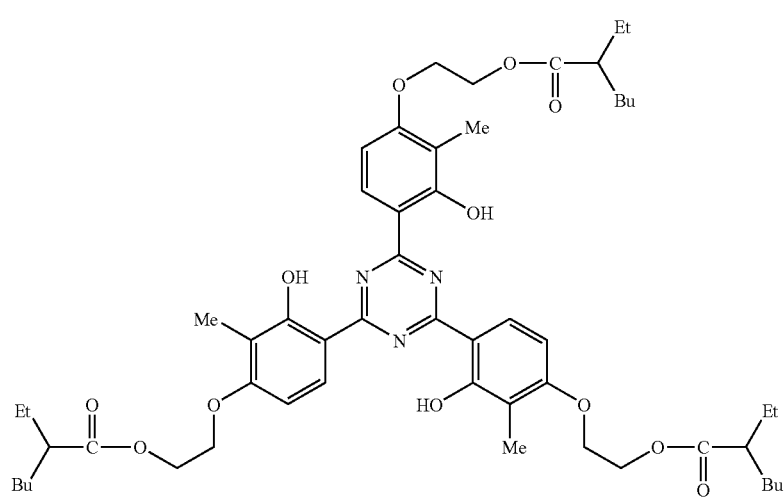

-continued
compound No. 24
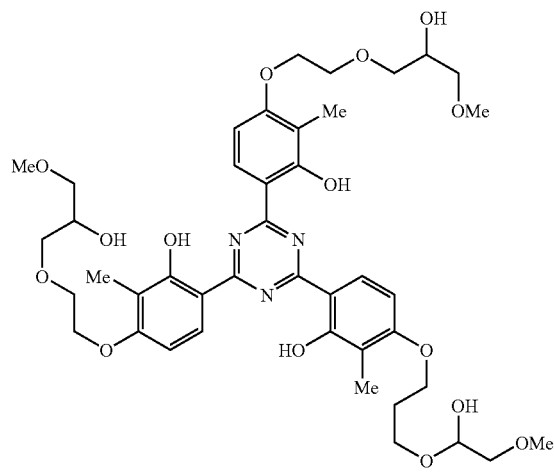
compound No. 25
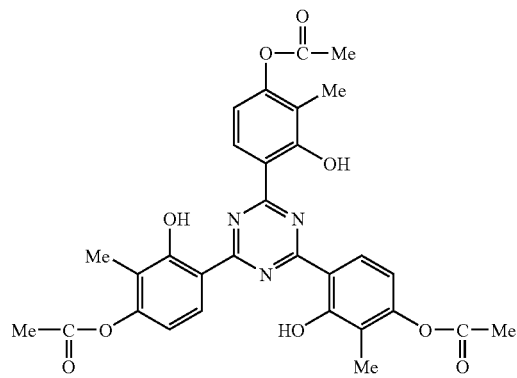
compound No. 26
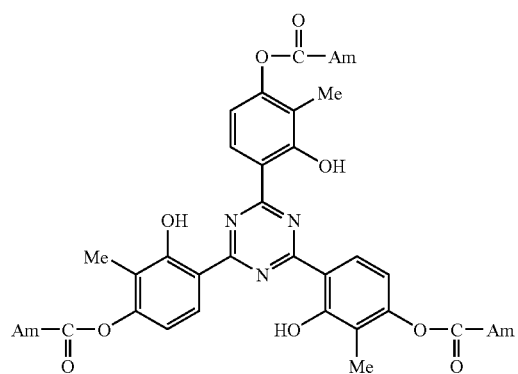
compound No. 27
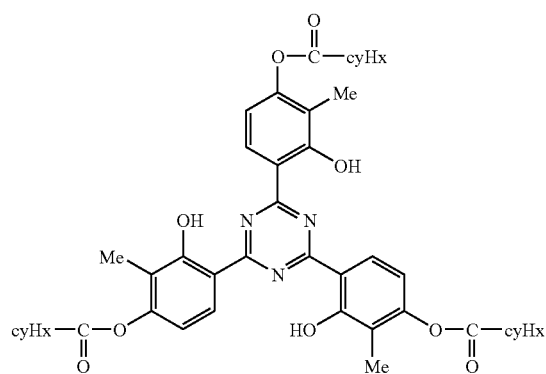
compound No. 28
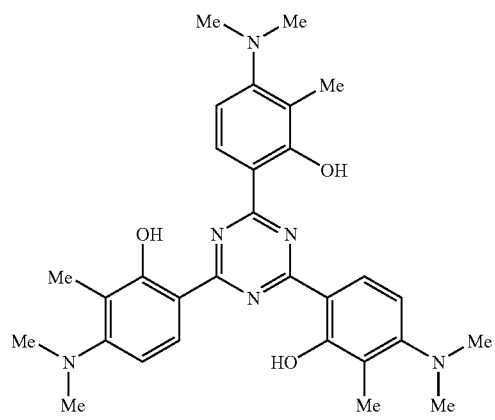
compound No. 29
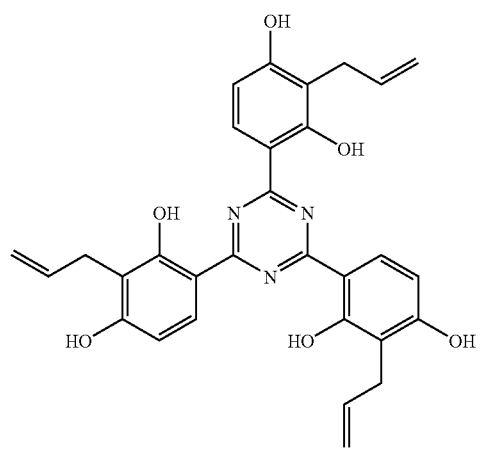

-continued
compound No. 30
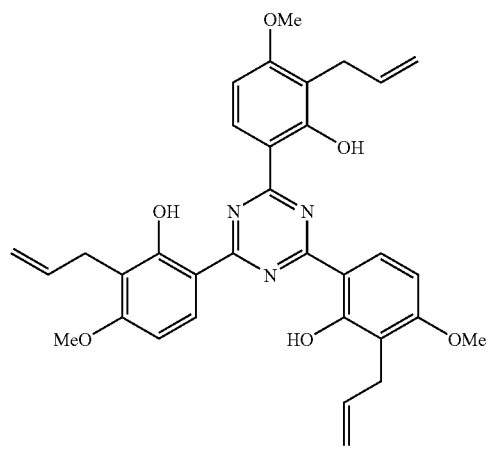
compound No. 31
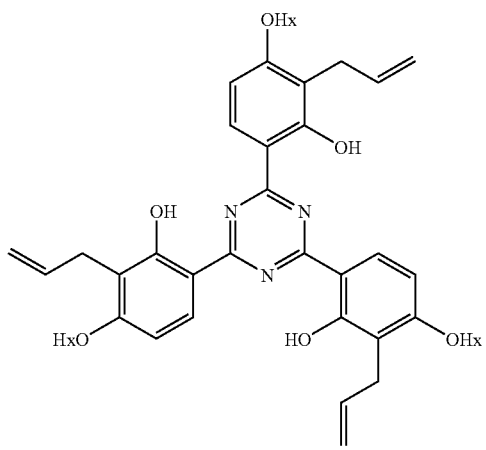
compound No. 32
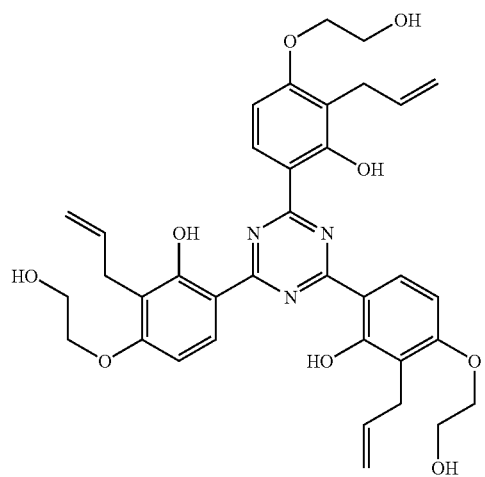
compound No. 33
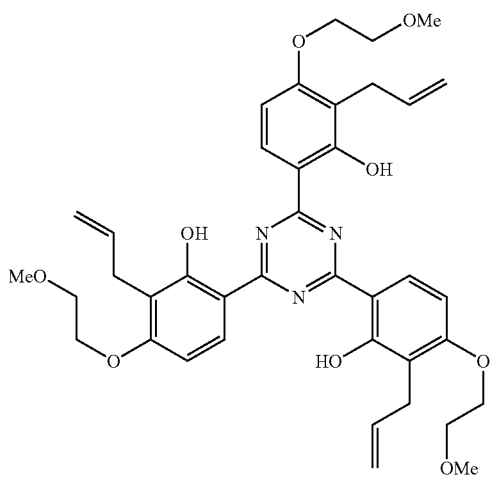
compound No. 34
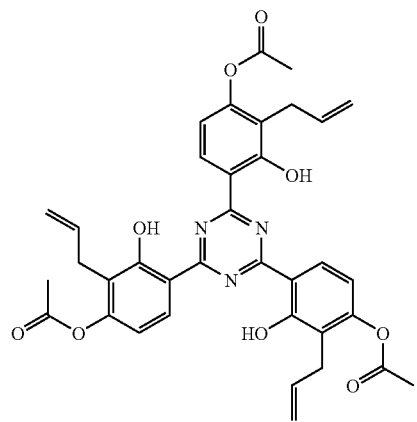
compound No. 35
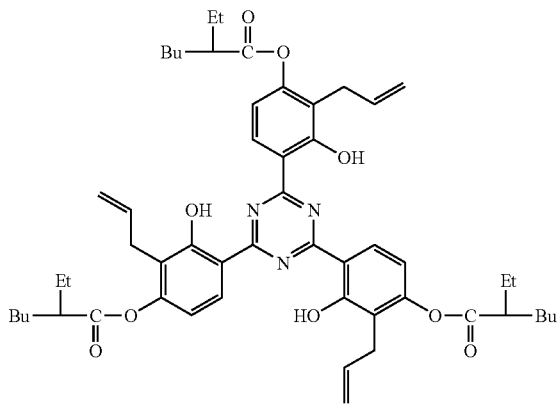

-continued compound No. 36

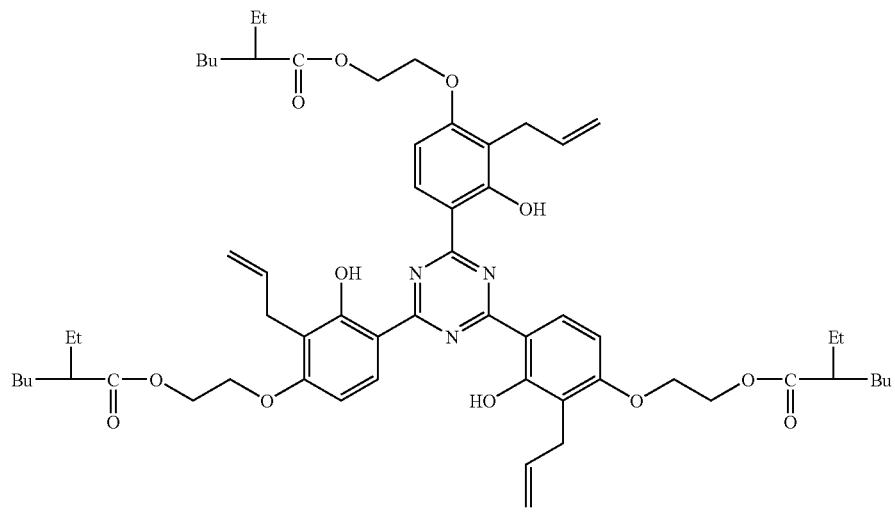

The method of synthesizing the triazine compound represented by the general formula (I) or (II) is not particularly limited, and any common synthesis method may be used. For example, the addition reaction of a phenol derivative or a resorcinol derivative with cyanuric chloride using aluminum trichloride, may be mentioned. The substituents represented by $R^1$-$R^6$ and $R^7$-$R^{12}$ may be introduced after forming the triazine structure, or may be introduced into the phenolic compound or resorcinol derivative before forming the triazine structure.

It is sufficient to use an amount of the aforesaid triazine compound as an ultraviolet absorber in the optical film of the present invention within a range in which transmission of visible light is not interfered while fully stopping ultraviolet ray transmission of the optical film is realized, so its amount is preferably 10-0.001 mass parts, and more preferably 5-0.01 mass parts, relative to 100 mass parts of resin.

The optical film of the present invention preferably has a transmittance with respect to light of 380 nm, of 20% or less. The transmittance with respect to visible light (400-800 nm) is 70% or more, and preferably 80% or more.

The optical film of the present invention maintains the ultraviolet absorption effect to a superior degree because the triazine compound hardly bleeds out from the film.

The resin forming the optical film of the present invention is not particularly limited, and may be selected in view of physical properties suitable for the intended application of the optical film.

Examples of the aforesaid resin are polyolefin resins and copolymers of monomers giving these polymers, such as high density polyethylene, isotactic polypropylene, syndiotactic polypropylene, hemiisotactic polypropylene, polybutene-1, poly 3-methyl-1-butene, poly 3-methyl-1-pentene, poly-4-methyl-1-pentene, ethylene/propylene block or random copolymer, ethylene-vinyl acetate copolymer and olefin-maleimido copolymer; halogen-containing resins such as polyvinyl chloride, polyvinylidene chloride, chlorinated polyethylene, polyvinylidene fluoride, chlorinated rubber, vinyl chloride-vinyl acetate copolymer, vinyl chloride-ethylene copolymer, vinyl chloride-vinylidene chloride-vinyl acetate terpolymer, vinyl chloride-acrylic ester copolymer, vinyl chloride-maleate copolymer and vinyl chloride-cyclohexyl maleimide copolymer; polyester resins such as polyethylene terephthalate (PET), polybutylene terephthalate (PBT), polyethylenenaphthalate (PEN), poly-1,4-cyclohexane dimethylene terephthalate, polyethylene-1,2-diphenoxyethane-4,4'-dicarboxylate and polyhexamethylene terephthalate; styrene resins such as polystyrene, high impact polystyrene (HIPS), acrylonitrile butadiene styrene rubber (ABS), chlorinated polyethylene acrylonitrile styrene (ACS), styrene acrylonitrile (SAN), acrylonitrile butyl acrylate styrene (AAS), styrene-butadiene rubber, styrene maleic acid, styrene maleimide, ethylene propylene acrylonitrile styrene (AES) and butadiene methacrylic acid methyl styrene (MBS); polycarbonate resins such as polycarbonates and branched polycarbonates; polyamide resins such as polyamides using aromatic dicarboxylic acids or alicyclic dicarboxylic acids such as polyhexamethylene adipamide (nylon 66), polycaprolactam (nylon 6) and nylon 6T; polyphenylene oxide (PPO) resin; denatured polyphenylene oxide resin; polyphenylene sulfide (PPS) resin; polyacetal (POM); denatured polyacetal; polysulfone; polyether sulfone; polyether ketone; polyether imide; polyoxyethylene; petroleum resin; cumarone resin; cycloolefin resins such as norbornene resin, cycloolefin-olefin copolymer resin; polyvinyl acetate resin; polyvinyl alcohol resin; acrylate resins such as polymethylmethacrylate; polymer alloys of polycarbonate and styrene resins; polyvinyl alcohol resin; cellulose resins such as diacetyl cellulose, triacetyl cellulose (TAC), propionyl cellulose, butyryl cellulose, acetyl propionate cellulose and nitrocellulose; liquid crystal polymers (LCP); silicone resins; urethane resins; biodegradable resins of aliphatic polyesters of aliphatic dicarboxylic acids, aliphatic diols, aliphatic polyester derived from aliphatic hydroxycarboxylic acids or ring compounds thereof, or biodegradable resin such as aliphatic polyesters wherein the molecular weight was increased by diisocyanate; and recycled resins thereof. Thermosetting resins such as phenol resin, urea resin, melamine resin, epoxy resin and unsaturated polyester resin, may be also mentioned. The resin may also be a rubber polymer compound, such as natural rubber (NR), polyisoprene rubber (IR), styrene-butadiene rubber (SBR), polybutadiene rubber (BR), ethylene-propylene-diene rubber (EPDM), isobutylene-isoprene rubber (IIR), polychloroprene rubber, acrylonitrile-butadiene rubber (NBR) or silicone rubber.

For an optical film in an image display device, a film with a high transmittance to visible light is used. For example, a polyolefin resin, polyester resin, polycarbonate resin, polyamide resin, polysulfone, polyether sulfone, polyether ketone, polyether imide, polyoxyethylene, norbornene resin, acrylic resin or cellulose resin, is preferred.

In the optical film of the present invention, it is important that the triazine compound hardly bleeds out.

The aforesaid resin may be used alone, mixture and/or copolymer of two or more resins, or may be used in a shape of a lamination according to the intended use.

The method of forming the optical film of the present invention is not particularly limited, therefore, any suitable method for the aforesaid resin components is able to use. The method of forming the film may be for example the solution casting method or the melt molding method.

In the solution casting method, a resin solution obtained by dissolving a resin in a solvent, is cast on flat plates or rolls of various heat-resistant materials, steel belts, or metal foils using a bar coat, spin coat, dip coat, T-die, T-die with bar, doctor knife coat, air knife coat, roll coat, die coat, photogravure coat or extrusion coat using a hopper, and the solvent component is dried to obtain a film. To form the optical film of the present invention, a solution obtained by adding the required amount of the triazine compound to the resin solution may be used. The solution casting method can be adapted also to film-forming using radical polymerization by light, anionic polymerization or cationic polymerization of a resin starting material monomer.

The melt molding method is a method obtaining a film by melt extrusion using a T-die or the inflation method; calender method; heat press method; or injection molding using a melted resin composition.

The optical film of the present invention is useful in image display devices such as a liquid crystal display (LCD), a plasma display panel (PDP), an electroluminescence display (ELD), a cathode-ray tube display (CRT), a luminescence display tube and a field emission type display. It is particularly useful in a liquid crystal display wherein an organic material having inferior ultraviolet radiation resistance is used as a display element, and also particularly useful for an optical compensation film of an organic EL display and a luminous protection film. For example, in a liquid crystal display, a polarizing plate protective film, phase difference film, viewing angle expansion film, optical compensation film, anti-reflection film and color tone adjustment film may be mentioned.

The thickness of the optical film of the present invention may be set according to the resin component and intended application. For example, when used for a polarizing plate protective film, the thickness is normally 5-500 μm, preferably 10-150 μm and more preferably 20-100 μm. If the thickness of the film is too thin, there is a possibility that strength may decrease. If the sheet is too thick, transparency will be inferior, birefringence will become high and the appearance may degrade.

Various additives may be used in the optical film of the present invention as required, and various kinds of surface treatment may be performed.

Examples of the aforesaid additive are an optical absorption clouring matter, pigment, dye, antioxidant, photostabilizer, ultraviolet absorber other than the triazine compound according to the present invention, near-infrared absorber, infrared absorber, antistatic agent, lubricant, processing aid, plasticizer, inorganic particle, halogen compound, phosphate compound, phosphoric acid amide compound, melamine compound, fluororesin, or flame retarder such as a metal oxide, melamine(poly)phosphate or piperazine(poly)phosphate.

Examples of the various aforesaid surface treatments are a treatment with chemical agents, mechanical treatment, corona discharge treatment, flame treatment, UV irradiation treatment, high frequency treatment, glow discharge treatment, active plasma treatment, laser treatment, mixed acid treatment and ozone oxidation treatment.

Due to the surface treatment, a lot of imperfections or lines may be formed on the surface.

EXAMPLES

The present invention will now be described in further detail referring to evaluation examples, examples and comparative examples. However, the invention is not to be construed as being limited in any way by these examples.

[Evaluation of Ultraviolet Absorber]

Regarding suitability as an ultraviolet absorber for optical films the volatility (5 mass % reduction temperature by differential thermal analysis) and molar extinction coefficient (chloroform solution with a concentration of $3.0 \times 10^{-5}$ mol/L) at 380 nm, were evaluated.

The ultraviolet absorber with a large 5 mass % reduction temperature hardly bleeds out from the optical film, and maintained its ultraviolet absorption effect to a superior degree. The larger the molar extinction coefficient of the ultraviolet absorber at 380 nm is, the more easily a sufficient effect can be obtained using a smaller amount of the ultraviolet absorber, which makes it suitable for use in an optical film. The results are shown in TABLES 1-2.

TABLE 1

| Ultraviolet absorber | 5 mass % reduction temperature | 380 nm molar extinction coefficient |
|---|---|---|
| Compound No.18 | 385° C. | 29,430 |
| Comparison compound 1 | 378° C. | 521 |
| Comparison compound 2 | 381° C. | 4,080 |
| Comparison compound 3 | 369° C. | 10,830 | comparative compound 1

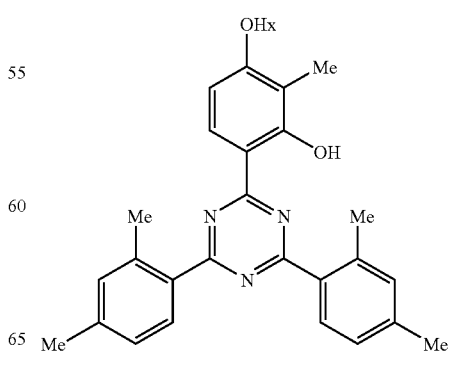

TABLE 1-continued

| Ultraviolet absorber | 5 mass % reduction temperature | 380 nm molar extinction coefficient |
|---|---|---| comparative compound 2

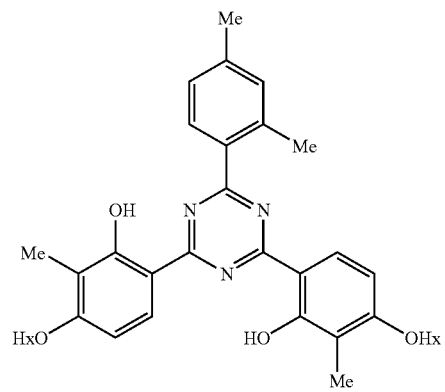

comparative compound 3

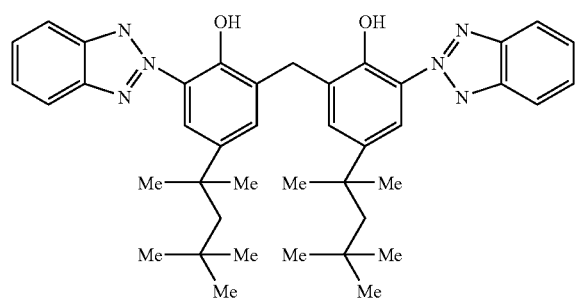

TABLE 2

| Ultraviolet absorber | 5 mass % reduction temperature | 380 nm molar extinction coefficient |
|---|---|---|
| Compound No. 4 | 386° C. | 37,270 |
| Compound No. 12 | 390° C. | 28,420 |
| Compound No. 15 | 387° C. | 31,210 |
| Compound No. 17 | 385° C. | 34,052 |

From the evaluation results for the aforesaid ultraviolet absorber, the triazine compound according to the present invention has a larger light absorption at a wavelength of 380 nm compared to the comparison compounds, and since the 5 mass % reduction temperature is also equivalent or greater compared to the comparison compounds, it is superior for use in an optical film.

Hereafter, some examples of the optical film of the invention will be described.

Example 1

A resin solution comprising 65 mass parts of a mixed solvent of cyclohexane/toluene (1/9 mass ratio), 35 mass parts of norbornene resin (commercial name ZEONOR 1060R, Nippon Zeon Co., Ltd.) and 2.0 mass parts of the ultraviolet absorber disclosed in TABLE 3, was spread on a surface-polished glass plate with a bar coater, pre-dried at 50° C. for 20 minutes, and dried at 90° C. for 30 minutes to obtain a 25 μm film. For the obtained film, the transmittance at a light wavelength of 380 nm was measured using a U-3010 spectrophotometer, manufactured by Hitachi, Ltd. The results are shown in TABLE 3.

TABLE 3

| No. | Ultraviolet absorber | 380 nm transmittance (%) |
|---|---|---|
| Example 1-1 | Compound No. 4 | 9.07 |
| Example 1-2 | Compound No. 12 | 16.0 |
| Example 1-3 | Compound No. 15 | 12.7 |
| Example 1-4 | Compound No. 18 | 7.22 |
| Comparative example 1-1 | — | 89.9 |
| Comparative example 1-2 | Comparison compound No. 2 | 20.2 |
| Comparative example 1-3 | Comparison compound No. 3 | 21.6 |

Example 2

(Combination 2)

100 g of Iupilone S-3000 (polycarbonate resin manufactured by Mitsubishi Gas Chemical Co., Inc.) was blended with 3 g of Compound No. 28.

The aforesaid Combination 2 was melt kneaded at 280° C. for 5 minutes with a plast-mill. After kneading, it was extruded from a nozzle of diameter 6 mm, and pellets were obtained using a water-cooled pelletizer. Using an electric heating press these pellets were molded at 280° C. to obtain a film of 0.25 mm thickness. For the obtained film, the transmittance at a light wavelength of 380 nm was measured in an identical way to that of Example 1. The result was 1.4%.

Example 3

(Combination 3)

100 g of Adeka Arkls R-103 (acrylate resin manufactured by Asahi Denka Kogyo K.K., resin component 50 wt %), was blended with 1.5 g of Compound No. 31.

A resin composite was manufactured with the aforesaid Combination 3, this was applied to a polyethylene terephthalate (PET) film of thickness 188 microns by a bar coater #9, and dried at 80° C. for 30 seconds to obtain a bilayer film. Next, this bilayer film was bonded to an alkali glass plate of thickness 0.9 mm by thermo-compression at 100° C., and a PET film cover glass sheet having an optical film containing the ultraviolet absorber between a glass plate and a PET film, was manufactured. For the obtained PET film cover glass sheet, the transmittance at a light wavelength of 380 nm was measured in an identical way to that of Example 1. The result was 1.0%.

From the aforesaid Examples 1-3, it was confirmed that the optical film of the present invention had superior absorbance at a light wavelength of 380 nm, superior ultraviolet radiation blocking capability, and little bleed-out.

INDUSTRIAL APPLICABILITY

According to the present invention, an optical film having high ultraviolet absorption capability at 380 nm with little bleed-out can be provided.

The optical film may be used in various functional films such as a polarizing plate protective film, a phase difference film, a viewing angle expansion film, an optical compensation film used for liquid crystal display etc. and an anti-reflection film used for a plasma display; an optical compensation film of an organic EL display; and a luminous protective film.

What is claimed:

1. An optical film comprising a resin composition containing a polymer and a triazine compound, and said triazine compound is of formula (I):

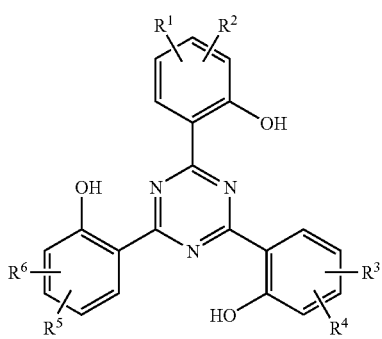

wherein
$R^1$-$R^6$ are each independently a hydrogen atom; a hydroxyl group; or an organic group selected from alkyl groups, alkoxy groups, dialkyl amino groups, alkyl carbonyloxy groups, aryl group, arylated alkyl groups, aryloxy groups, arylated alkyloxy groups, and aryl carbonyloxy groups having 18 or less carbon atoms, wherein the alkyl part of said organic groups is optionally substituted by a hydroxyl group, halogen atom, cyano group or nitro group, interrupted by an oxygen atom, sulfur atom, carbonyl group, ester group, amide group or imino group, or have a double bond, or a combination of these substitutions, interruptions and double bonds, and wherein said polymer is a polyolefin, a polyolefin copolymer, a polyvinyl chloride, a polyvinylidene chloride, a chlorinated polyethylene, a polyvinylidene fluoride, a chlorinated rubber, a vinyl chloride-vinyl acetate copolymer, a vinyl chloride-ethylene copolymer, a vinyl chloride-vinylidene chloride-vinyl acetate terpolymer, a vinyl chloride-acrylic ester copolymer, a vinyl chloride-maleate copolymer, a vinyl chloride-cyclohexyl maleimide copolymer, a polycarbonate, a branched polycarbonate, a polyamide, a denatured polyphenylene oxide, a polyphenylene sulfide, a polyacetal, a denatured polyacetal, a polysulfone, a polyether sulfone, a polyether ketone, a polyether imide, a polyoxyethylene, a petroleum, a cumarone, a cycloolefin, a polyvinyl acetate, a polyvinyl alcohol, an acrylate, a polymer alloy of polycarbonate and a styrene resin, a polyvinyl alcohol, a cellulose resin, a liquid crystal polymer, a silicone resin, a urethane, a biodegradable resin, a phenol resin, a urea resin, a melamine resin, an epoxy resin, an unsaturated polyester resin, natural rubber, polvisoprene rubber, a styrene-butadiene rubber, a polybutadiene rubber, an ethylene-propylene-diene rubber, an isobutylene-isoprene rubber, a polychloroprene rubber, a acrylonitrile-butadiene rubber, or a silicone rubber.

2. The optical film according to claim 1, wherein said triazine compound is of formula (II):

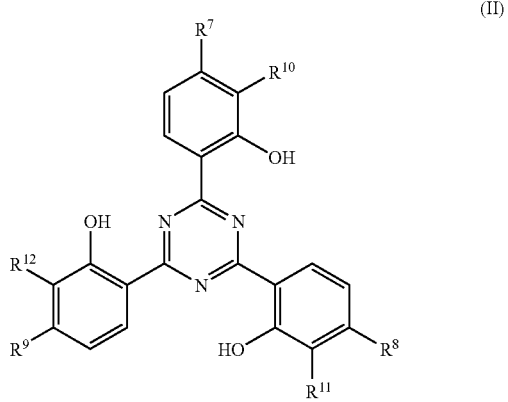

wherein
$R^7$-$R^9$ are each independently a hydroxyl group, or an organic group selected from alkoxy groups, dialkyl amino groups, and alkyl carbonyloxy groups, each having 18 or less carbon atoms, wherein the alkyl part of said alkoxy groups and alkyl carbonyloxy groups is optionally substituted by a hydroxyl group, halogen atom, cyano group or nitro group, interrupted by an oxygen atom, sulfur atom, carbonyl group, ester group, amide group or imino group, or have a double bond, or a combination of these substitutions, interruptions and double bonds.

3. The optical film according to claim 1, wherein said film has a transmittance to light of 380 nm of 20% or less.

4. An optical film according to claim 1, wherein the amount of said triazine compound in said resin is 10-0.001 mass parts per 100 mass parts of resin.

5. An optical film according to claim 4, wherein the amount of said triazine compound in said resin is 5-0.01 mass parts per 100 mass parts of resin.

6. An optical film according to claim 1, wherein said film has a transmittance with respect to visible light of 70% or more.

7. An optical film according to claim 1, wherein said polymer is a polyolefin or polyolefin copolymer.

8. An optical film according to claim 7, wherein said polymer is high density polyethylene, isotactic polypropylene, syndiotactic polypropylene, hemiisotactic polypropylene, polybutene-1, poly 3-methyl-1-butene, poly 3-methyl-1-pentene, poly-4-methyl-1-pentene, ethylene/propylene block or random copolymer, ethylene-vinyl acetate copolymer or olefin-maleimido copolymer.

9. An optical film according to claim 1, wherein said polymer is polyvinyl chloride, polyvinylidene chloride, chlorinated polyethylene, polyvinylidene fluoride, chlorinated rubber, vinyl chloride-vinyl acetate copolymer, vinyl chloride-ethylene copolymer, vinyl chloride-vinylidene chloride-vinyl acetate terpolymer, vinyl chloride-acrylic ester copolymer, vinyl chloride-maleate copolymer or vinyl chloride-cyclohexyl maleimide copolymer.

10. An optical film according to claim 1, wherein said polymer is a styrene polymer.

11. An optical film according to claim 10, wherein said polymer is polystyrene, high impact polystyrene, acrylonitrile butadiene styrene rubber, chlorinated polyethylene acrylonitrile styrene, styrene acrylonitrile, acrylonitrile butyl acrylate styrene, styrene-butadiene rubber, styrene maleic acid, styrene maleimide, ethylene propylene acrylonitrile styrene, butadiene methacrylic styrene, or acid methyl styrene.

12. An optical film according to claim 1, wherein said polymer is a polycarbonate or branched polycarbonates.

13. An optical film according to claim 1, wherein said polymer is a polyamide, a denatured polyphenylene oxide, a polyphenylene sulfide, a polyacetal (POM), a denatured polyacetal, a polysulfone, a polyether sulfone, a polyether ketone, a polyether imide, a polyoxyethylene, a petroleum, a cumarone, a cycloolefin, a polyvinyl acetate, a polyvinyl alcohol, an acrylate, a polymer alloy of polycarbonate and styrene resin, a polyvinyl alcohol, a cellulose resin, a liquid crystal polymer, a silicone resin, a urethane, or a biodegradable resin.

14. An optical film according to claim 1, wherein said polymer is a phenol resin, a urea resin, a melamine resin, an epoxy resin, an unsaturated polyester resin, natural rubber, polyisoprene rubber, styrene-butadiene rubber, polybutadiene rubber, ethylene-propylene-diene rubber, isobutylene-isoprene rubber, polychloroprene rubber, acrylonitrile-butadiene rubber, or silicone rubber.

15. An optical film comprising a resin composition containing a polymer and a triazine compound, and said triazine compound is of formula (I):

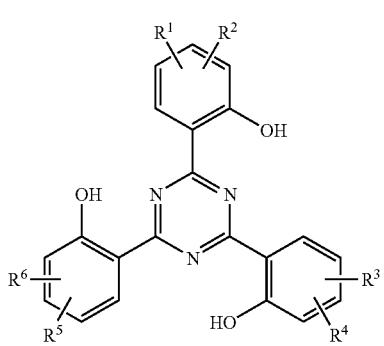

(I)

wherein
$R^1$-$R^6$ are each independently a hydrogen atom; a hydroxyl group; or an organic group selected from alkyl groups, alkoxy groups, dialkyl amino groups, alkyl carbonyloxy groups, aryl group, arylated alkyl groups, aryloxy groups, arylated alkyloxy groups, and aryl carbonyloxy groups having 18 or less carbon atoms, wherein the alkyl part of said organic groups is optionally substituted by a hydroxyl group, halogen atom, cyano group or nitro group, interrupted by an oxygen atom, sulfur atom, carbonyl group, ester group, amide group or imino group, or have a double bond, or a combination of these substitutions, interruptions and double bonds, and
wherein said polymer is a polyolefin, polycarbonate, polyamide, polysulfone, polyether sulfone, polyether ketone, polyether imide, polyoxyethylene, norbornene, acrylic or cellulose resin.

16. An optical film according to claim 1, wherein $R^1$-$R^6$ are each independently
methyl, ethyl, propyl, isopropyl, butyl, s-butyl, t-butyl, isobutyl, amyl, isoamyl, t-amyl, hexyl, heptyl, 2-methylhexyl, isoheptyl, t-heptyl, n-octyl, isooctyl, t-octyl, 2-ethylhexyl, nonyl, isononyl, decyl, dodecyl, tridecyl, tetradecyl, pentadecyl, hexadecyl, heptadecyl, octadecyl, cyclopentyl, cyclohexyl, cycloheptyl, cyclooctyl, chloromethyl, dichloromethyl, trichloromethyl, 2-hydroxyethyl, 2-hydroxypropyl, 3-hydroxypropyl, 2-methoxyethyl, 2-ethoxyethyl, 2-butoxyethyl, 2-methoxypropyl, 3-methoxypropyl, 2,3-dihydroxypropyl, 2-hydroxy-3-methoxypropyl, 2,3-dimethoxypropyl, 2-(2-methoxyethoxy) ethyl, methyloxy, ethyloxy, propyloxy, isopropyloxy, butyloxy, s-butyloxy, t-butyloxy, sobutyloxy, amyloxy, isoamyloxy, t-amyloxy, hexyloxy, heptyloxy, 2-methylhexyloxy, isoheptyloxy, t-heptyloxy, n-octyloxy, isooctyloxy, t-octyloxy, 2-ethylhexyloxy, nonyloxy, iso nonyloxy, decyloxy, dodecyloxy, tridecyloxy, tetradecyloxy, pentadecyloxy hexadecyloxy, heptadecyloxy, octadecyloxy, cyclopentyloxy, cyclohexyloxy, cycloheptyloxy, cyclooctyloxy chloromethyloxy, dichloromethyloxy, trichloro methyloxy, 2-hydroxyethyloxy, 2-hydroxypropyloxy, 3-hydroxypropyloxy, 2,3-dihydroxypropyloxy, 2-(2-hydroxyethoxy)ethyloxy, 2-methoxyethyloxy, 2-ethoxyethyloxy, 2-butoxyethyloxy, 2-octyloxyethyloxy, 2-methoxy propyloxy, 3-methoxypropyloxy, 2-methoxy-3-hydroxypropyloxy, 2-hydroxy-3-methoxypropyloxy, 2,3-dimethoxypropyloxy, 2-hydroxy-3-octyloxypropyloxy, 2-(2-methoxyethoxy) ethyloxy, 2-hydroxy-3-(2-methoxy ethoxy) propyloxy, 2-acetoxyethyloxy, 2-acetoxypropyloxy, 3-acetoxy propyloxy, 2-(2-acetoxyethoxy)ethyloxy, 2-propionylethyloxy, 2-octanoyl ethyloxy, 2-dibutylcarbamoylethyloxy, dimethylamino, ethylmethylamino, diethylamino, dibutylamino, dioctylamino, 1-piperidyl, an alkylcarbonyloxy group derived from acetic acid, propionic acid, butyric acid, isobutyric acid, valeric acid, caproic acid, caprylic acid, 2-ethylhexanoic acid, pelargonic acid, capric acid, neodecanoic acid, undecanoic acid, lauric acid, tridecanoic acid, myristic acid, pentadecanoic acid, palmitic acid, margaric acid, stearic acid, cyclohexane carboxylic acid, 3-methylcyclohexane carboxylic acid, 4-methylcyclohexane carboxylic acid, 2,4-dimethylcyclohexane carboxylic acid, chloroacetic acid, dichloroacetic acid, trichloroacetic acid, trifluoroacetic acid, or 12-hydroxystearic acid, phenyl, naphthyl, 2-methylphenyl, 3-methylphenyl, 4-methyl phenyl, 4-vinylphenyl, 3-isopropylphenyl, 4-isopropylphenyl, 4-butylphenyl, 4-isobutylphenyl, 4-t-butylphenyl, 4-hexylphenyl, 4-cyclohexylphenyl, 4-octylphenyl, 4-(2-ethylhexyl) phenyl, 2,3-dimethylphenyl, 2,4-dimethyl phenyl, 2,5-dimethylphenyl, 2,6-dimethylphenyl, 3,4-dimethylphenyl, 3,5-dimethylphenyl, 2,4-di-t-butylphenyl, 2,5-di-t-butylphenyl, 2,6-di-t-butylphenyl, 2,4-di-t-pentylphenyl, 2,5-di-t-amylphenyl, 2,5-di-t-octylphenyl, biphenyl, 2,4,5-trimethylphenyl, benzyl, phenethyl, 2-phenyl propane-2-yl, diphenylmethyl, phenyloxy, naphthyloxy, 2-methylphenyloxy, 3-methyl phenyloxy, 4-methylphenyloxy, 4-vinylphenyloxy, 4-isopropylphenyloxy, 4-butylphenyloxy, 4-isobutylphenyloxy, 4-t-butylphenyloxy, 4-hexyl phenyloxy, 4-cyclohexylphenyloxy, 4-octylphenyloxy, 4-(2-ethylhexyl) phenyloxy, 2,3-dimethylphenyloxy, 2,4-dimethylphenyloxy, 2,5-dimethyl phenyloxy, 2,6-dimethylphenyloxy, 3,4-dimethylphenyloxy, 3,5-dimethyl phenyloxy, 2,4-di-t-butylphenyloxy, 2,5-di-t-butylphenyloxy, 2,6-di-t butylphenyloxy, 2,4-di-t-pentylphenyloxy, 2,5-di-t-amylphenyloxy, 2,5-di-t-octyl phenyloxy, biphenyloxy, 2,4,5-trimethylphenyloxy, benzyloxy, phenethyloxy, 2-phenylpropane-2-yl-oxy, diphenylmethyloxy, or an aryl carbonyloxy group derived from benzoic acid, 4-hydroxybenzoic acid, salicylic acid, naphthoic acid, 4-methylbenzoic acid, 4-t-butylbenzoic acid, or 4-octylbenzoic acid.

17. An optical film according to claim 2, wherein $R^7$-$R^{12}$ are each independently methyl, ethyl, propyl, isopropyl, butyl, s-butyl, t-butyl, isobutyl, amyl, isoamyl, t-amyl, hexyl, heptyl, 2-methylhexyl, isoheptyl, t-heptyl, n-octyl, isooctyl, t-octyl, 2-ethylhexyl, nonyl, isononyl, decyl, dodecyl, tridecyl, tetradecyl, pentadecyl, hexadecyl, heptadecyl, octadecyl, cyclopentyl, cyclohexyl, cycloheptyl, cyclooctyl, chloromethyl, dichloromethyl, trichloromethyl, 2-hydroxyethyl, 2-hydroxypropyl, 3-hydroxypropyl, 2-methoxyethyl, 2-ethoxyethyl, 2-butoxyethyl, 2-methoxypropyl, 3-methoxypropyl, 2,3-dihydroxypropyl, 2-hydroxy-3-methoxypropyl, 2,3-dimethoxypropyl, 2-(2-methoxyethoxy) ethyl, methyloxy, ethyloxy, propyloxy, isopropyloxy, butyloxy, s-butyloxy, t-butyloxy, sobutyloxy, amyloxy, isoamyloxy, t-amyloxy, hexyloxy, heptyloxy, 2-methylhexyloxy, isoheptyloxy, t-heptyloxy, n-octyloxy, isooctyloxy, t-octyloxy, 2-ethylhexyloxy, nonyloxy, iso nonyloxy, decyloxy, dodecyloxy, tridecyloxy, tetradecyloxy, pentadecyloxy hexadecyloxy, heptadecyloxy, octadecyloxy, cyclopentyloxy, cyclohexyloxy, cycloheptyloxy, cyclooctyloxy chloromethyloxy, dichloromethyloxy, trichloro methyloxy, 2-hydroxyethyloxy, 2-hydroxypropyloxy, 3-hydroxypropyloxy, 2,3-dihydroxypropyloxy, 2-(2-hydroxyethoxy)ethyloxy, 2-methoxyethyloxy, 2-ethoxyethyloxy, 2-butoxyethyloxy, 2-octyloxyethyloxy, 2-methoxy propyloxy, 3-methoxypropyloxy, 2-methoxy-3-hydroxypropyloxy, 2-hydroxy-3-methoxypropyloxy, 2,3-dimethoxypropyloxy, 2-hydroxy-3-octyloxypropyloxy, 2-(2-methoxyethoxy) ethyloxy, 2-hydroxy-3-(2-methoxy ethoxy) propyloxy, 2-acetoxyethyloxy, 2-acetoxypropyloxy, 3-acetoxy propyloxy, 2-(2-acetoxyethoxy)ethyloxy, 2-propionylethyloxy, 2-octanoyl ethyloxy, 2-dibutylcarbamoylethyloxy, dimethylamino, ethylmethylamino, diethylamino, dibutylamino, dioctylamino, 1-piperidyl, an alkylcarbonyloxy group derived from acetic acid, propionic acid, butyric acid, isobutyric acid, valeric acid, caproic acid, caprylic acid, 2-ethylhexanoic acid, pelargonic acid, capric acid, neodecanoic acid, undecanoic acid, lauric acid, tridecanoic acid, myristic acid, pentadecanoic acid, palmitic acid, margaric acid, stearic acid, cyclohexane carboxylic acid, 3-methylcyclohexane carboxylic acid, 4-methylcyclohexane carboxylic acid, 2,4-dimethylcyclohexane carboxylic acid, chloroacetic acid, dichloroacetic acid, trichloroacetic acid, trifluoroacetic acid, or 12-hydroxystearic acid, phenyl, naphthyl, 2-methylphenyl, 3-methylphenyl, 4-methyl phenyl, 4-vinylphenyl, 3-isopropylphenyl, 4-isopropylphenyl, 4-butylphenyl, 4-isobutylphenyl, 4-t-butylphenyl, 4-hexylphenyl, 4-cyclohexylphenyl, 4-octylphenyl, 4-(2-ethylhexyl) phenyl, 2,3-dimethylphenyl, 2,4-dimethyl phenyl, 2,5-dimethylphenyl, 2,6-dimethylphenyl, 3,4-dimethylphenyl, 3,5-dimethylphenyl, 2,4-di-t-butylphenyl, 2,5-di-t-butylphenyl, 2,6-di-t-butylphenyl, 2,4-di-t-pentylphenyl, 2,5-di-t-amylphenyl, 2,5-di-t-octylphenyl, biphenyl, 2,4,5-trimethylphenyl, benzyl, phenethyl, 2-phenyl propane-2-yl, diphenylmethyl, phenyloxy, naphthyloxy, 2-methylphenyloxy, 3-methyl phenyloxy, 4-methylphenyloxy, 4-vinylphenyloxy, 4-isopropylphenyloxy, 4-butylphenyloxy, 4-isobutylphenyloxy, 4-t-butylphenyloxy, 4-hexyl phenyloxy, 4-cyclohexylphenyloxy, 4-octylphenyloxy, 4-(2-ethylhexyl) phenyloxy, 2,3-dimethylphenyloxy, 2,4-dimethylphenyloxy, 2,5-dimethyl phenyloxy, 2,6-dimethylphenyloxy, 3,4-dimethylphenyloxy, 3,5-dimethyl phenyloxy, 2,4-di-t-butylphenyloxy, 2,5-di-t-butylphenyloxy, 2,6-di-t butylphenyloxy, 2,4-di-t-pentylphenyloxy, 2,5-di-t-amylphenyloxy, 2,5-di-t-octyl phenyloxy, biphenyloxy, 2,4,5-trimethylphenyloxy, benzyloxy, phenethyloxy, 2-phenylpropane-2-yl-oxy, diphenylmethyloxy, or an aryl carbonyloxy group derived from benzoic acid, 4-hydroxybenzoic acid, salicylic acid, naphthoic acid, 4-methylbenzoic acid, 4-t-butylbenzoic acid, or 4-octylbenzoic acid.

18. An optical film according to claim 1, wherein said triazine compound is selected from the following compound Nos. 1-36:

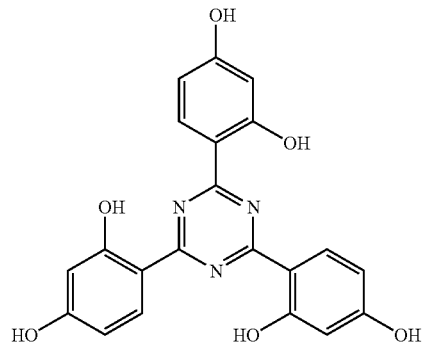

compound No. 1

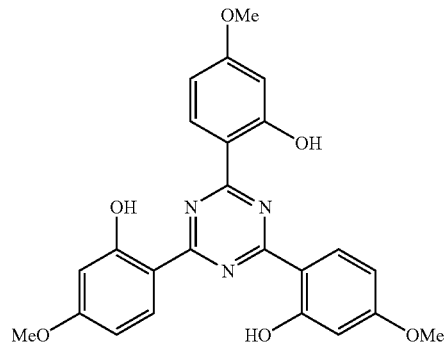

compound No. 2

-continued
compound No. 3
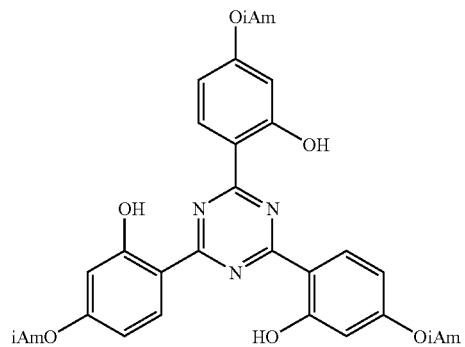
compound No. 4
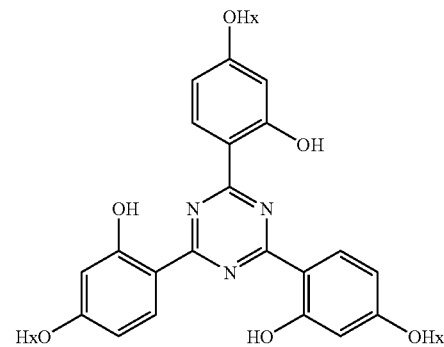
compound No. 5
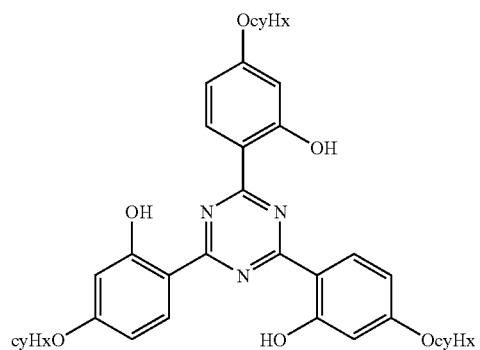
compound No. 6
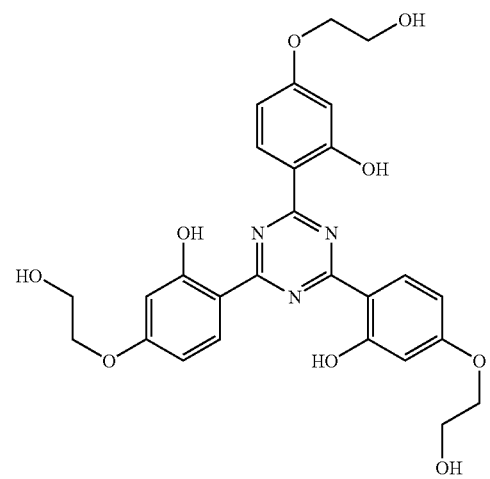
compound No. 7
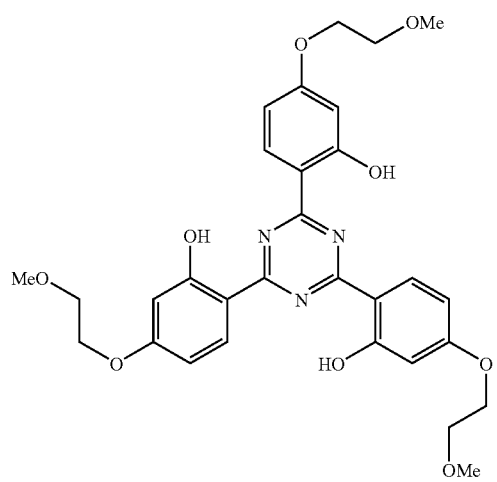
compound No. 8
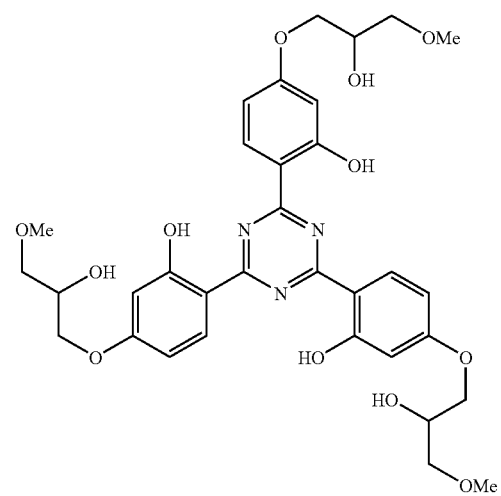

-continued
compound No. 9
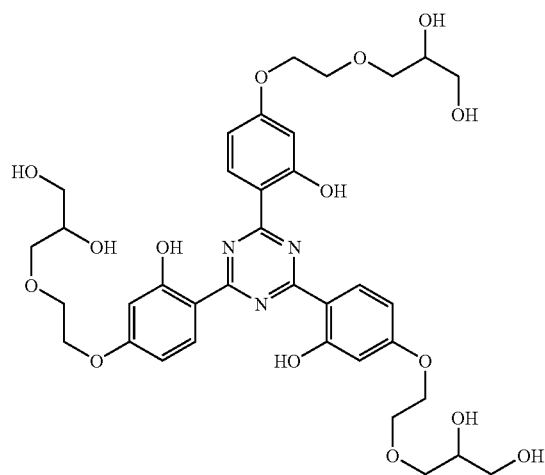
compound No. 10
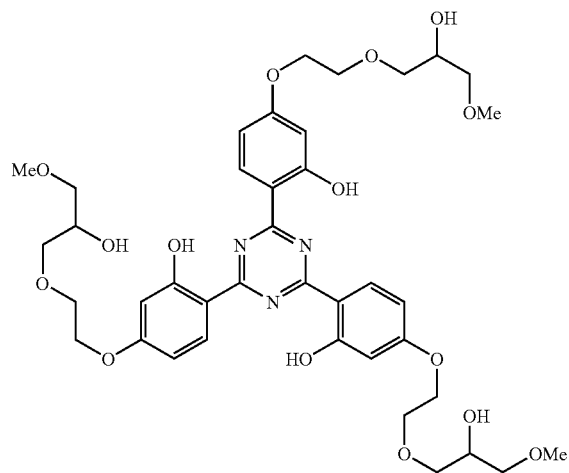
compound No. 11
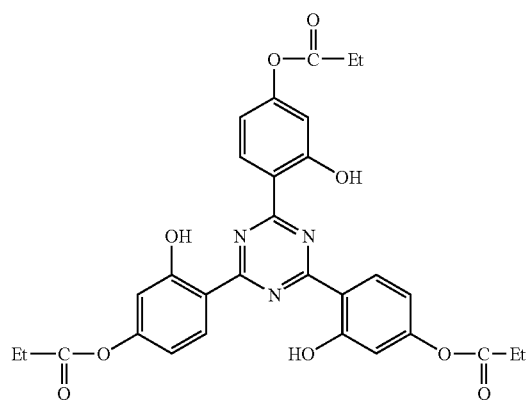
compound No. 12
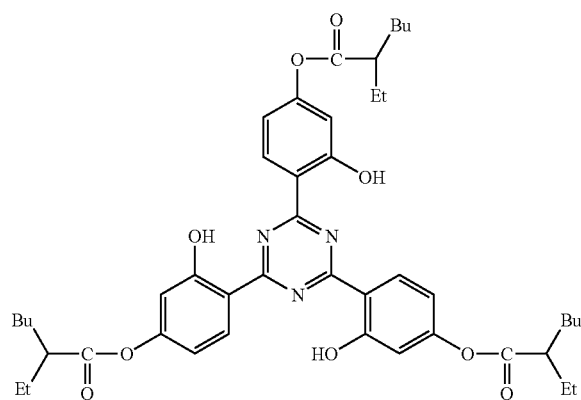
compound No. 13
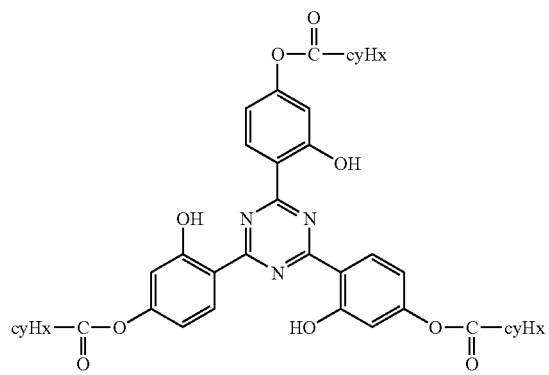
compound No. 14
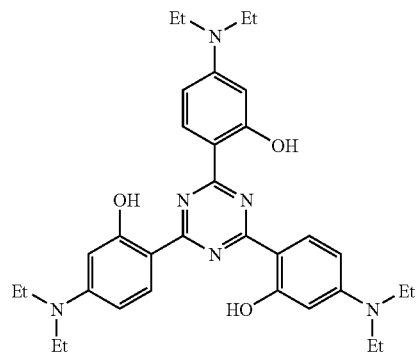

-continued
compound No. 15
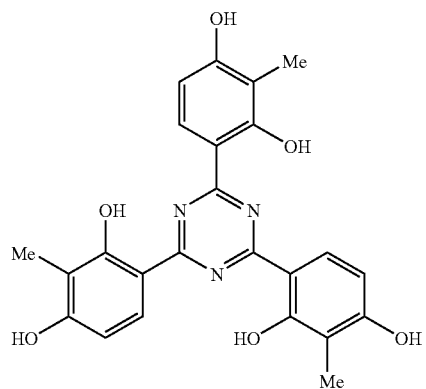
compound No. 16
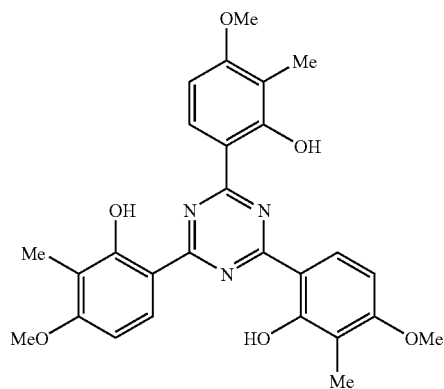
compound No. 17
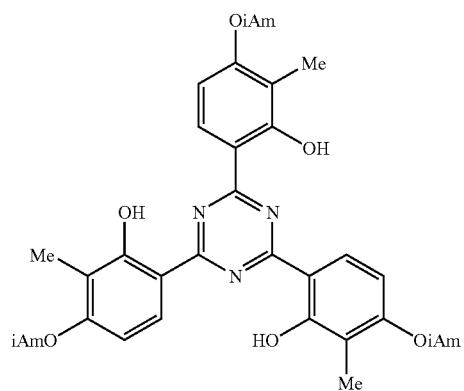
compound No. 18
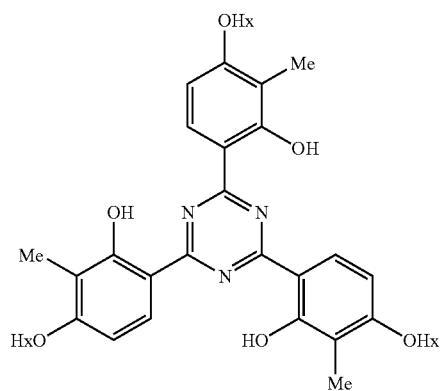
compound No. 19
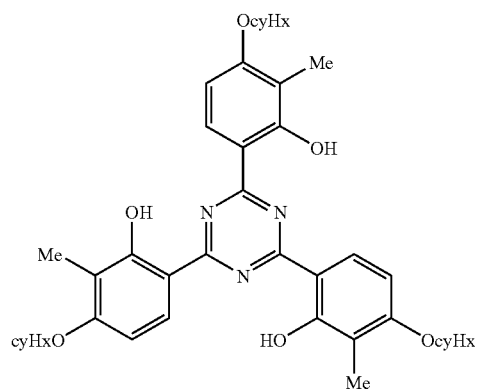
compound No. 20
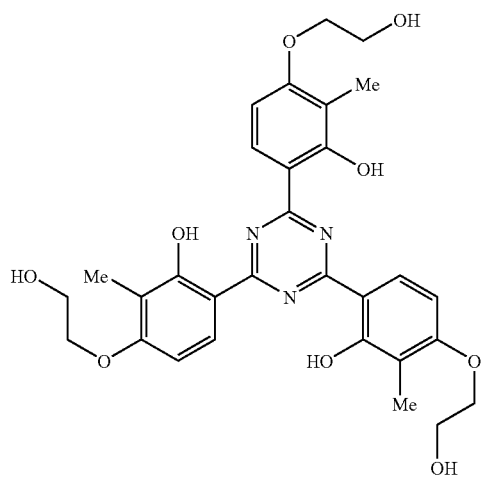

-continued
compound No. 21
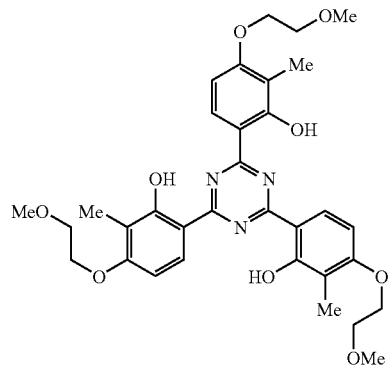
compound No. 22
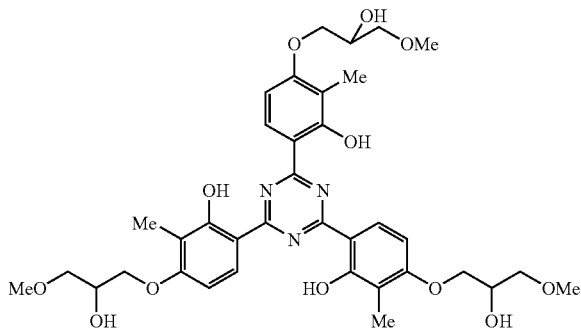
compound No. 23
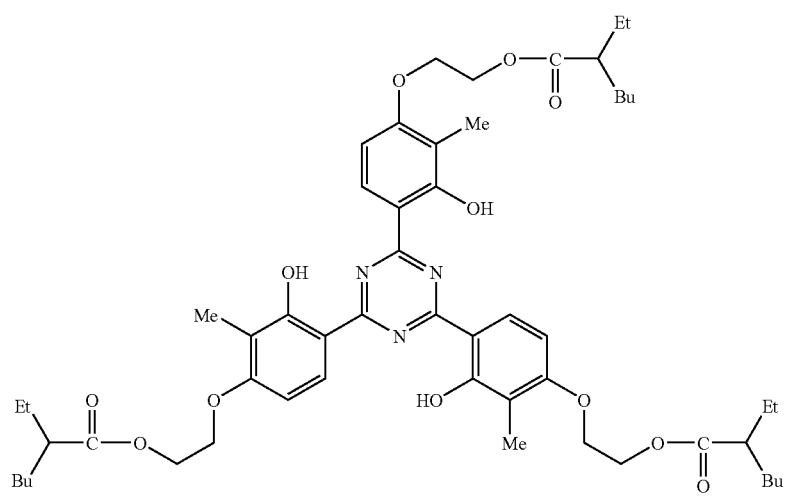
compound No. 24
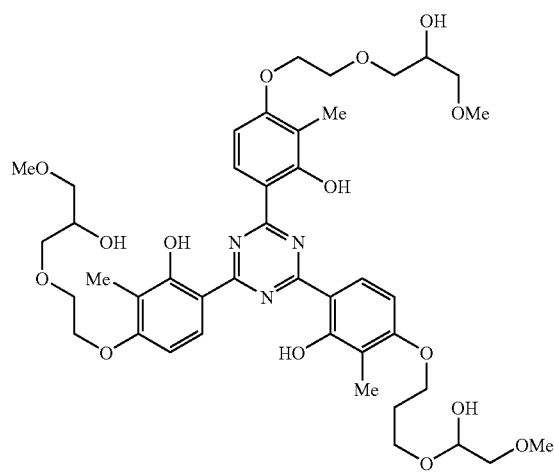
compound No. 25
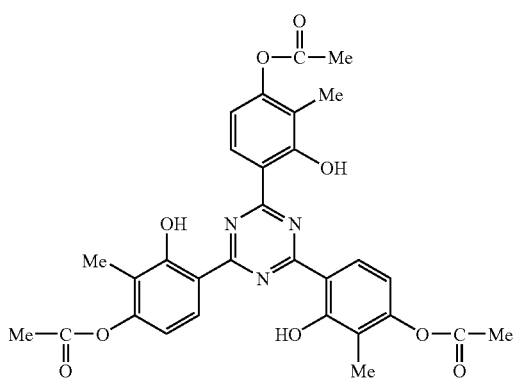

-continued
compound No. 26
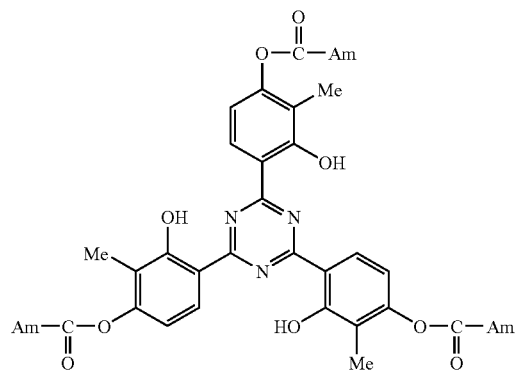
compound No. 27
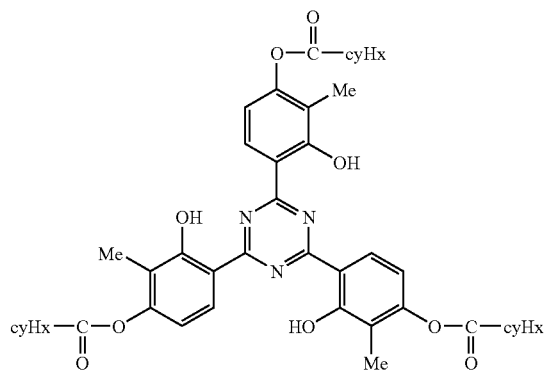
compound No. 28
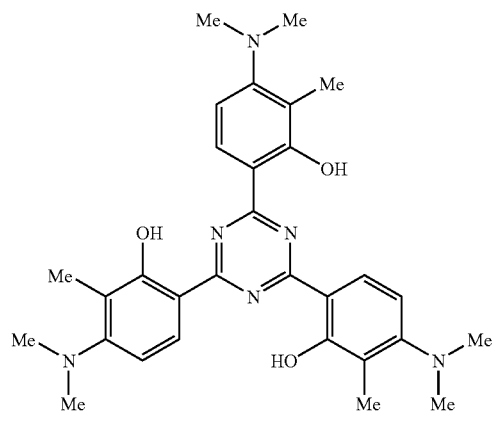
compound No. 29
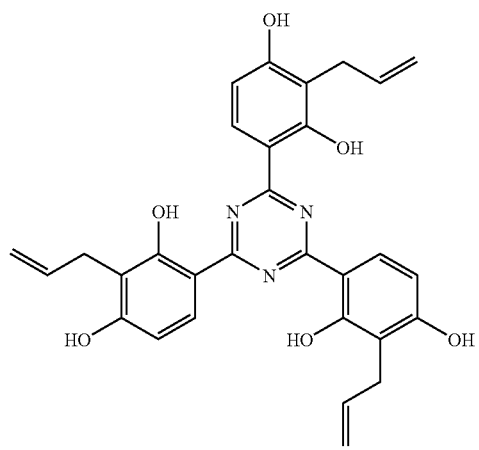
compound No. 30
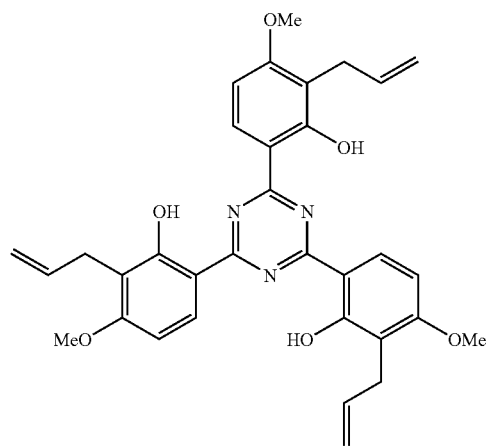
compound No. 31
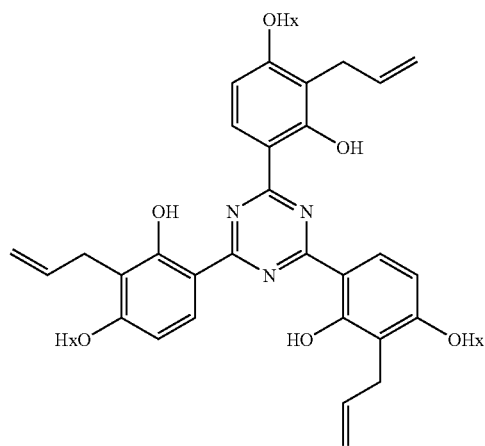

-continued
compound No. 32
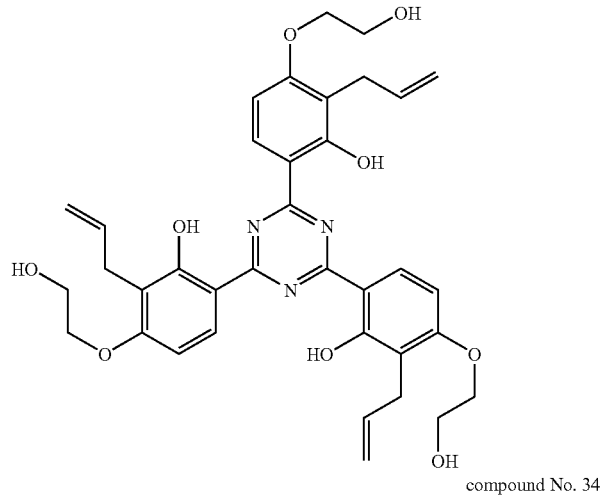
compound No. 33
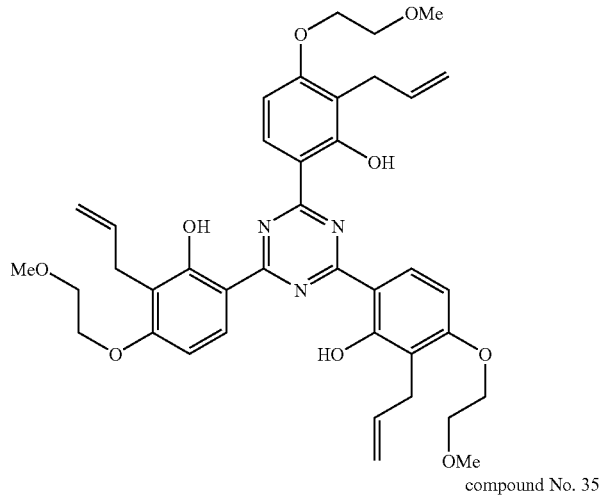
compound No. 34
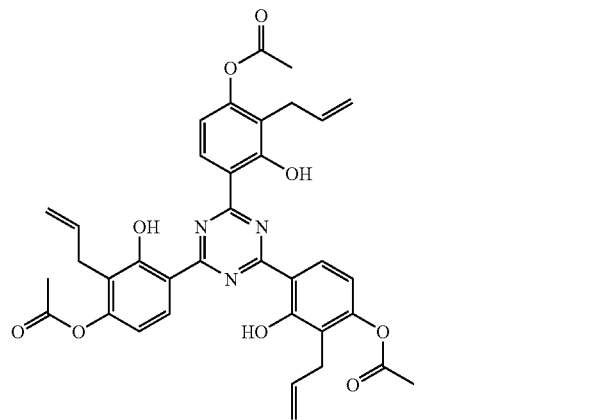
compound No. 35
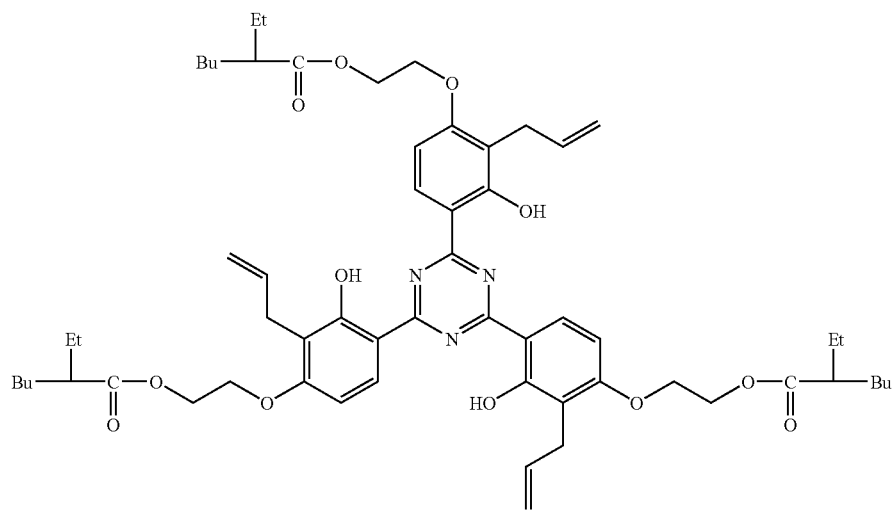
compound No. 36
wherein Me is methyl, Et is ethyl, Bu is butyl, Am is amyl, iAm is isoamyl, Hx is hexyl, and cyHx is cyclohexyl.
* * * * *